US008827310B2

(12) United States Patent
Schnitzer

(10) Patent No.: US 8,827,310 B2
(45) Date of Patent: Sep. 9, 2014

(54) ADJUSTABLE STEERING COLUMN FOR A MOTOR VEHICLE

(75) Inventor: Rony Schnitzer, Ruggell (LI)

(73) Assignee: Thyssenkrupp Presta Aktiengesellschaft, Eschen (LI)

( * ) Notice: Subject to any disclaimer, the term of this patent is extended or adjusted under 35 U.S.C. 154(b) by 411 days.

(21) Appl. No.: 13/391,460

(22) PCT Filed: Jul. 27, 2010

(86) PCT No.: PCT/EP2010/004580
§ 371 (c)(1),
(2), (4) Date: Feb. 21, 2012

(87) PCT Pub. No.: WO2011/020538
PCT Pub. Date: Feb. 24, 2011

(65) Prior Publication Data
US 2012/0144953 A1 Jun. 14, 2012

(30) Foreign Application Priority Data
Aug. 21, 2009 (DE) .......................... 10 2009 038 317

(51) Int. Cl.
*B62D 1/184* (2006.01)
(52) U.S. Cl.
CPC ....................................... *B62D 1/184* (2013.01)
USPC ............................................ 280/775; 74/493
(58) Field of Classification Search
CPC ......... B62D 1/184; B62D 1/185; B62D 1/187
USPC ............................................ 280/775; 74/493
See application file for complete search history.

(56) References Cited

U.S. PATENT DOCUMENTS 5,743,150 A * 4/1998 Fevre et al. ..................... 74/493
5,787,759 A * 8/1998 Olgren ............................ 74/493
(Continued)

FOREIGN PATENT DOCUMENTS

DE 100 31 721 12/2001
DE 102 34 514 1/2004
(Continued)

OTHER PUBLICATIONS

International Search Report issued Nov. 12, 2010 in International (PCT) Application No. PCT/EP2010/004580.
(Continued)

*Primary Examiner* — Drew Brown
(74) *Attorney, Agent, or Firm* — Wenderoth, Lind & Ponack, L.L.P.

(57) ABSTRACT

An adjustable steering column for a motor vehicle includes a casing unit that rotatably supports a steering shaft, first and second lateral flanges, which can be fastened to the body and between which the casing unit is arranged, a locking device that comprises a clamping bolt, which penetrates the lateral flanges through openings and which is moved in the axial direction when the locking device is opened and closed, and first and second locking elements, between which the casing unit is arranged. The first locking element interacts with a first mating locking element in the closed state of the locking device, and the second locking element interacts with a second mating locking element in the closed state of the locking device. A stop element is arranged on or against the clamping bolt in the area between the two lateral flanges, said stop element being at a distance from a counter-stop in the closed state of the locking device.

14 Claims, 5 Drawing Sheets

(56) References Cited

U.S. PATENT DOCUMENTS

| | | | |
|---|---|---|---|
| 5,988,679 A | 11/1999 | Schelling et al. | |
| 6,092,957 A | 7/2000 | Fevre et al. | |
| 6,390,717 B1 * | 5/2002 | Bar | 403/104 |
| 7,677,133 B2 * | 3/2010 | Matsui et al. | 74/493 |
| 7,721,620 B2 * | 5/2010 | Matsui et al. | 74/493 |
| 7,752,940 B2 * | 7/2010 | Lutz | 74/493 |
| 8,413,541 B2 * | 4/2013 | Davies et al. | 74/493 |
| 8,500,168 B2 * | 8/2013 | Goulay et al. | 280/777 |
| 8,578,812 B2 * | 11/2013 | Minamigata | 74/492 |
| 2005/0217407 A1 | 10/2005 | Yamamura | |

FOREIGN PATENT DOCUMENTS

| | | |
|---|---|---|
| DE | 10 2006 016 361 | 8/2007 |
| DE | 10 2006 034 714 | 1/2008 |
| DE | 10 2007 003 091 | 8/2008 |
| EP | 0 802 104 | 10/1997 |
| EP | 0 836 981 | 4/1998 |
| EP | 0 900 943 | 3/1999 |
| EP | 1 359 082 | 11/2003 |
| GB | 2 295 219 | 5/1996 |
| WO | 01/81149 | 11/2001 |
| WO | 2004/016492 | 2/2004 |
| WO | 2007/009576 | 1/2007 |
| WO | 2008/011945 | 1/2008 |

OTHER PUBLICATIONS

German Search Report issued Aug. 21, 2009 in German Patent Application No. 10 2009 038 317.4.

* cited by examiner

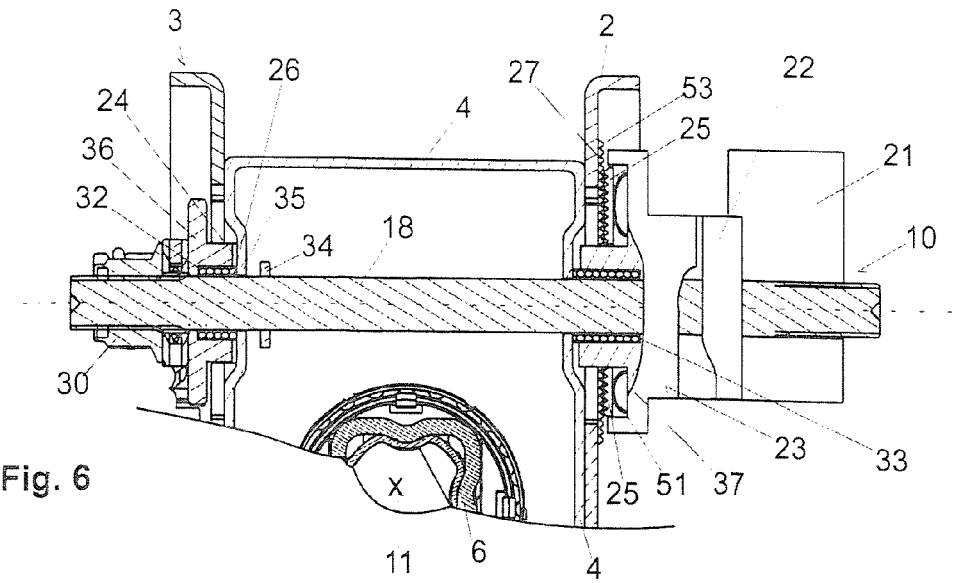
Fig. 6
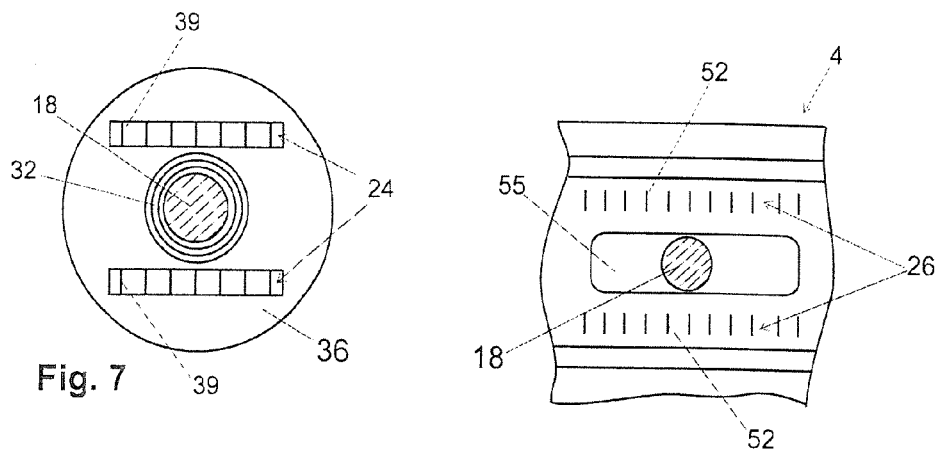
Fig. 7
Fig. 8
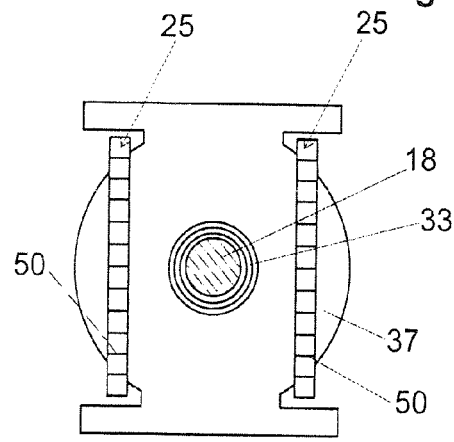
Fig. 9

ADJUSTABLE STEERING COLUMN FOR A MOTOR VEHICLE

BACKGROUND OF THE INVENTION

The invention relates to an adjustable steering column for a motor vehicle, comprising a jacket unit rotatably supporting a steering spindle, first and second side jaws that can be stationarily secured in position on the vehicle body and between which the jacket unit is disposed, a securement device in the open state of which the jacket unit can be adjusted such that it is adjustable with respect to the side jaws in at least one adjustment direction and, in the closed state of which, the set position of the jacket unit is secured in position with respect to the side jaws. The steering column further comprises a clamp bolt penetrating the side jaws through openings, the clamp bolt being shiftable in its axial direction during the opening and closing of the securement, and first and second securement elements between which the jacket unit is disposed and of which the first securement element in the closed state of the securement device cooperates with a first counter-securement element disposed on the first side jaw or is retained by it or is disposed on an intermediate unit disposed between the jacket unit and the side jaws or is retained by it, and of which the second securement element in the closed state of the securement device cooperates with a second counter-securement element disposed on the second side jaw or retained by it or is disposed on the intermediate unit or is retained by it.

In such steering columns, a clamp bolt penetrates side jaws secured in position on the side of the vehicle body, between which the jacket unit supporting the steering spindle is disposed. On both sides of the side jaws, securement elements are provided for the securement of the set position of the steering column in the closed state of the securement device. These types of steering columns are known in various embodiments and are widely utilized. Through the clamp bolt penetrating the two side jaws and the securement elements located on both sides of the side jaws can be achieved a compact and stable implementation in which the load transfer into the vehicle body takes place as uniformly as possible.

The securement of the at least one adjustment capability of the steering column in the closed state of the securement device can herein be attained through elements acting under form closure or elements acting under force closure or by elements acting under force closure as well as also form closure or through combinations thereof, wherein these elements encompass the securement elements and counter-securement elements. The steering column can be adjustable in its longitudinal direction or in its height or inclination direction as well as also in length as well as also in height or inclination.

Such steering columns are disclosed for example in DE 10 2007 003 091 B3, WO 2007/009576 A1, WO 2008/011945 A1 and EP 802 104 A1. For example, WO 2007/009576 A1 discloses an adjustable steering column in which the securement elements disposed on the clamp bolt on both sides of the side jaws cooperate with at least on one of the two sides of the jacket unit with a counter-securement element which, in the unstressed state includes a slicing, projecting resiliently from the surface of the counter-securement element. Through this slicing an additional retention force against a dislocation, in particular in the event of a crash, of the steering column can be applied through the form-closure cooperation with the securement element. For the stand-off of the securement element from the counter-securement element in the opened state of the securement device, herein at least one spring element is provided which acts between the securement element and the counter-securement element. In the device disclosed in DE 10 2007 003 091 B3 at least one of the securement elements is formed by a lamella which includes toothings on its edges oriented in the direction of the height adjustment. In the closed state of the securement device, the securement element is pressed onto the side jaw against the force of spring arms which, in the opened state of the securement device, keep the securement element spaced apart from the side jaw, wherein the toothings of the securement element come into engagement with toothings of the side jaw in order to block the height displacement. In the case of the steering columns disclosed in WO 2008/011945 A1 and EP 802 104 A1 the securement of the adjustability of the steering column in the closed state of the securement device takes place only through elements cooperating through friction closure. In the latter case, intersecting spring packs disposed on both sides of the side jaws are provided in order to increase the clamping forces in the closed state of the securement device.

DE 102 34 514 B3 further shows a steering column with a securement device in which toothings are disposed or held on one side on the jacket unit and on the side jaw, which extend, for one, in the direction of the length adjustment, for another, in the direction of the height or inclination adjustment and which, in the closed state of the securement device cooperate with toothings of parts disposed on the clamp bolt. To enable the two adjustment directions to be latched and unlatched simultaneously, the separation distance of the two parts comprising the toothings must be precisely adapted. In the opened state of the securement device, the toothings of the parts disposed on the clamp bolt are brought out of engagement with the toothings of the jacket unit or the side jaw through a spring also disposed on the clamp bolt. A similar adjustable steering column is also disclosed in DE 10 2006 016 361 B3, wherein here the toothings acting in the two adjustment directions are implemented on a single securement part disposed on the clamp bolt.

Apart from such securement devices, in which on both sides of the jacket unit side jaws are provided penetrated by the clamp bolt, still further steering columns with securement devices are also known, in which only on one side of the jacket unit a side jaw is disposed onto which the jacket unit is pressed in the closed state of the securement device. The clamp bolt projects hereby through the side jaw into the jacket unit. Such securement devices are disclosed, for example, in EP 0 836 981 B1 and DE 10 031 721 C1. In these embodiments a massive and more complex guidance of the jacket unit is required in order to obtain adequate stability and to counteract tilting or canting.

SUMMARY OF THE INVENTION

The invention addresses the problem of providing a steering column with a securement device realizable in simple manner, in which during the opening of the securement device a controlled off-set of the elements effecting the securement is attained. This is accomplished according to the invention through an adjustable steering column with the features of the present invention. Advantageous further developments are found in the dependent claims.

In the closed state of a securement device of a steering column according to the invention, a stop element located in the region between the two side jaws on or at the clamp bolt is spaced apart from a counterstop. The stop element can, for example, be formed by a stop ring penetrated by the clamp bolt and disposed axially nondisplaceably on this bolt. The counterstop can be disposed on one of the two side jaws or a part connected thereto, wherein it preferably is formed by the inner face of the side jaw, or on the jacket unit or a part connected thereto or an intermediate unit disposed between the jacket unit and the side jaws. The counterstop is preferably formed by the inner face of a side shank of the intermediate unit disposed between one of the side jaws and the jacket unit or is formed by a part connected thereto. Through the abutment of the stop element on the counterstop, the axial shifting of the clamp bolt is delimited in the opened state of the securement device with respect to its position assumed in the closed state of the securement device.

In this manner, any clearance can be distributed under control that exists in the opened state of the securement device between elements of the securement device located on both sides of the center plane including the central longitudinal axis of the steering spindle and, in the mounted state of the steering column, vertically and parallel to the side jaws, or on both sides of the jacket unit.

An advantageous embodiment of the invention provides that at least one spring-elastic element is provided which, during the opening of the securement device, shifts the clamp bolt axially until the stop element comes into contact on the counterstop. Furthermore, on the side of the vertical center plane including the longitudinal axis of the steering spindle or on the side of the jacket unit, away from which the axial shifting of the clamp bolt is directed during the opening of the securement device, is suitably provided at least one second spring-elastic element. This element acts in terms of an off-set of elements disposed on this side of the vertical center plane or the jacket unit and cooperating in the closed state of the securement device for the securement of the adjustment. The spring force exerted by the first spring-elastic element or the spring force exerted overall by the first spring-elastic elements is herein greater than the spring force exerted by the second spring-elastic element or overall by the first spring-elastic elements. It is especially advantageous if the spring force of the spring-elastic element that is located on the far end of the clamp bolt from the pair of cam-link disks is greater than the spring force of the spring-elastic element located on the same side as the cam-link disk pair. Instead of a cam-link disk pair, other clamping elements for tightening the securement device in its closed state can also be provided, for example hydraulically, pneumatically or electrically actuatable elements. Thus, initially the axial shifting of the clamp bolt takes place until the stop element runs up on the counterstop, whereby off-setting of the elements effecting the securement on the one side of the jacket unit or the vertical center plane is achieved, and subsequently the remaining path made available during the opening of the securement device is utilized to off-set the elements effecting the securement located on the other side of the jacket unit or of the vertical center plane.

Through this realization can be prevented that elements effecting the securement become stuck in the opened state of the securement device if the steering column is to be adjusted. This realization is consequently especially advantageous if, at least to some extent, elements are utilized which effect the securement of the adjustability (also or only) under form closure.

An adjustable steering column realized in the manner according to the invention can be realized such that it is adjustable in its height or inclination as well as also in its length as well as its height or inclination. Herein, in an adjustment of the steering column in the particular adjustment direction, the jacket unit is displaced into this adjustment direction with respect to the body-stationary side jaws. In the securement in the closed state of the securement device, the securement elements cooperate with the counter-securement elements, wherein the securement action can be attained through elements acting under frictional closure or through elements acting under form closure or through elements acting under frictional closure (fixing through friction closure) as well as also elements acting under form closure (fixing through form closure) or through combinations hereof. As a securement element can be utilized, for example, for one of the possible adjustment directions a plate with toothings disposed displaceably on the clamp bolt and cooperating with a counter-securement element that includes a corresponding countertoothing which is located on the jacket unit or is integrally worked into the jacket unit. Conceivable and feasible is the utilization of friction enhancing surface layers.

It is conceivable and feasible to combine the two variants—fixing through form closure and fixing through friction closure. Thus, for example for fixing the adjustment into one of the adjustment directions can be provided a variant with toothings on one side of the jacket unit and, for fixing the adjustment into the other adjustment direction, the corresponding surfaces of the side jaw and of the jacket unit can be provided on the other side of the jacket unit. Similarly, in such a realization of the invention it can be provided to provide on one side of the jacket unit or the vertical center plane an off-set of a size adequate to release completely the meshing of the elements effecting the securement in the closed state of the securement device, while, on the other side of the jacket unit or vertical center plane, a lesser total travel is provided such as is sufficient for the release of a friction-closure securement.

BRIEF DESCRIPTION OF THE DRAWINGS

Further advantages and details of the invention will be explained in the following section in conjunction with the enclosed drawings, in which:

FIG. 6 shows a modified embodiment of a steering column according to the invention in cross-sectional depiction analogous to FIG. 4, in the closed state of the securement device;

FIG. 7 is an illustration of the first securement element corresponding to the embodiment of FIG. 6 in a view away from the center plane extending through the longitudinal axis 11 and parallel to the side jaws 1, 2;

FIG. 8 is an illustration of the first counter-securement element corresponding to the embodiment of FIG. 6 in a view away from the side toward the direction of the center plane through the longitudinal axis 11 which extends parallel to the side jaws 1, 2;

FIG. 9 is an illustration of the second securement element corresponding to the embodiment of FIG. 6 in a view away from the center plane extending through the longitudinal axis 11 and parallel to the side jaws 1, 2;

DETAILED DESCRIPTION OF THE INVENTION

Figure 1:
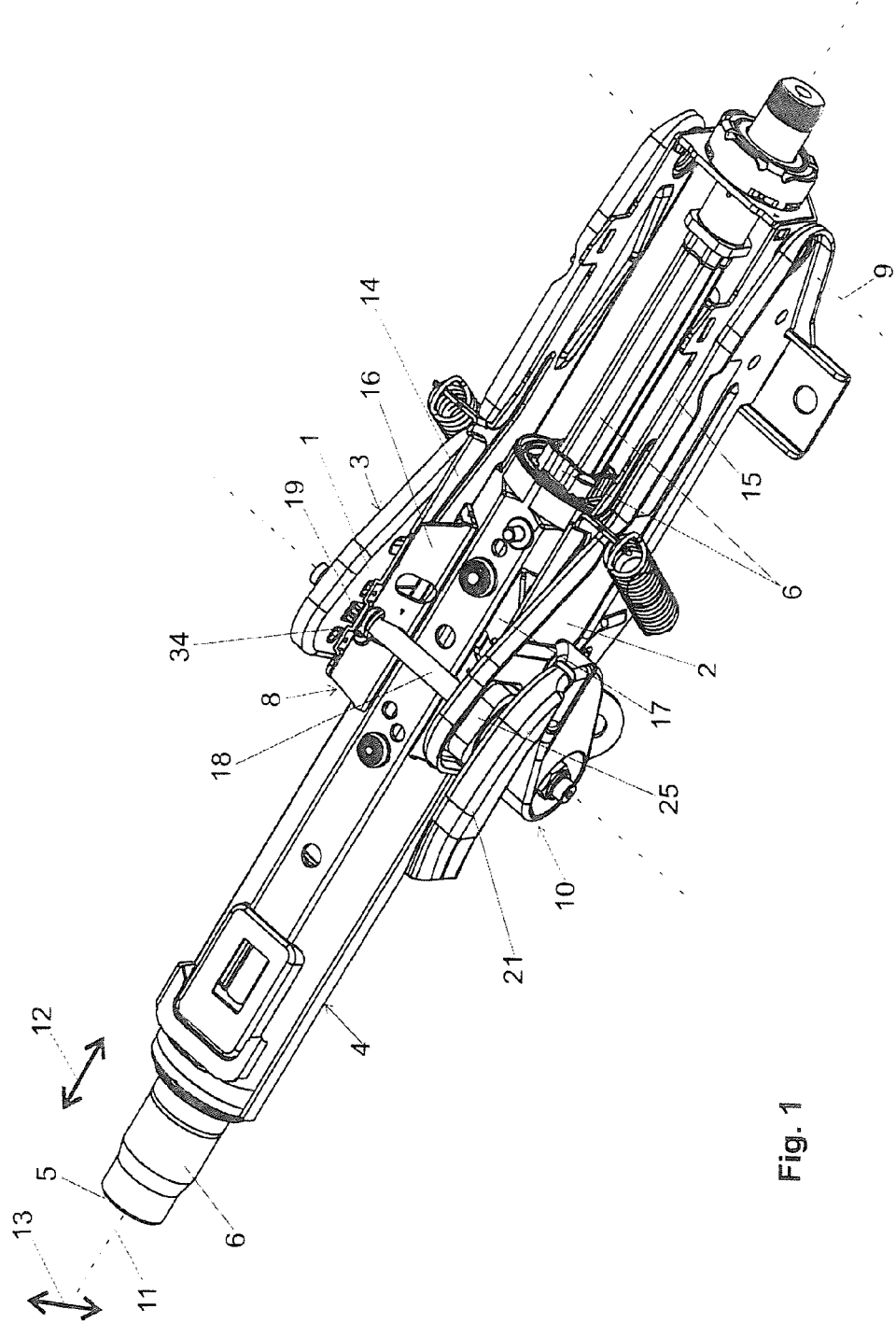
FIG. 1 is an oblique view of a steering column according to an embodiment of the invention (the actuation lever is partially cut off), wherein the side of the steering column located at the bottom in the mounted position is visible (the steering column is rotated with respect to the mounted position by 180° about the longitudinal axis of the steering spindle)

A first embodiment of an adjustable steering column according to the invention will be described in the following in conjunction with FIGS. 1 to 5. The steering column comprises first and second side jaws 1, 2 secured on the body of the motor vehicle. The side jaws 1, 2 in the depicted embodiments are for this purpose part of a support unit 3, which collectively is to be secured on the body of the motor vehicle. Individual attachment of the side jaws 1, 2 on the body is also conceivable and feasible.

A jacket unit 4 supports a section of a steering spindle 6, adjoining the steering wheel-side end 5 of the steering spindle, such that it is rotatable about the longitudinal axis 11 of the steering spindle 6. As shown, the jacket unit 4 can be implemented such that it is circumferentially closed or (at least partially) such that it is circumferentially open.

As shown, the support unit 3 can, for example, comprise at least one connection section 7 located in the mounted position of the steering column above the jacket unit 4, from which section the side jaws 1, 2 project downwardly. In a view in the axial direction of the steering spindle 6 therewith results a U-shaped realization of the support unit 3.

Between the support unit 3 and the jacket unit 4 is located an intermediate unit 8 which is supported swivellably with respect to the support unit 3 about an axis 9 extending at right angles to the axis of the steering spindle 6 and located horizontally in the mounted position.

The steering column further comprises a securement device 10. In the closed state of the securement device 10, the position of the jacket unit 4 is secured in position with respect to the support unit 3 as well as to the intermediate unit 8. In the opened state of the securement device 10, the jacket unit 4 can be displaced with respect to the support unit 3 in the direction of the longitudinal axis 11 of the steering spindle 6 (=length adjustment direction 12) and into an adjustment direction 13 for a height or inclination adjustment of the steering column. During the displacement in the adjustment direction 13, the intermediate unit 8 is swivelled with respect to the support unit 3 about the axis 9. During the displacement into the length adjustment direction 12 the jacket unit 4 is displaced with respect to the intermediate unit 8 in the direction of the longitudinal axis 11 of the steering spindle 6. To enable this displacement, the steering spindle 6 includes sections one telescopable into the other in a known manner. The section of the steering spindle 6 facing away from the steering wheel-side end 5 is advantageously supported in a bearing 54 fixed on the intermediate unit 8. The section of the steering spindle 6 facing away from the steering wheel-side end 5 is advantageously supported in a bearing 54 fixed on the intermediate unit 8. The brace support can alternatively also take place simply via a universal joint not shown here. It is alternatively also conceivable and feasible to realize the steering spindle 6 such that it is not telescopable. This is in particular applicable in steering columns that are not adjustable in their length. However, it is also conceivable to permit a displacement of the universal joint (not shown here).

The intermediate unit 8 includes side shanks 14, 15 between the particular side jaw 1, 2 and the jacket unit 4. The intermediate unit 8 encompasses the jacket unit 4 at least over a large portion of its circumference. In the embodiment, on the side shanks 14, 15, at least adjoining its connection site with the particular side shank 14, 15, clamping pieces or webs 16, 17 are disposed, which extend obliquely toward one another. Through cooperating areas, the jacket unit 4 is secured against turning with respect to the intermediate unit 8. As depicted, the jacket unit 4 can, for example, be implemented octagonally.

The securement device 10 comprises a clamp bolt 18 penetrating the side jaws 1, 2 of the support unit 3 through openings 19, 20. The openings 19, 20 are here realized in the form of elongated holes extending in the adjustment direction 13. The clamp bolt 18 further penetrates openings in the side shanks 14, 15 of intermediate unit 8 by the margins of which it is held nondisplaceably into the adjustment direction 13.

For the opening and closing of the securement device 10, an actuation lever 21 is connected to a cam disk 22 which it entrains during its turning about the axis of the clamp bolt 18 and which cooperates with a link disk 23.

On the clamp bolt 18 are disposed first and second securement elements 24, 25 penetrated by the clamp bolt through openings. The securement elements 24, 25 are located on both sides of side jaws 1, 2 such that the side jaws 1, 2 of support unit 3 are disposed between the securement elements 24, 25. The securement elements 24, 25 are guided and supported by first and second holding elements 36, 37 penetrated by clamp bolt 18. For example, for this purpose a central opening of the securement element 24, 25 is penetrated by a projection of the holding element 36, 37. In the closed state of the securement device the securement elements 24, 25 cooperate with first and second counter-securement elements 26, 27, which, in the depicted embodiment, are formed by outwardly directed surfaces of side jaws 1, 2 and thereon structures are implemented. The counter-securement elements 26, 27 could also be formed by parts held on the side jaws 1, 2 nondisplaceably at least into the adjustment direction 13 into which they act.

In the depicted embodiment, the securement elements 24, 25 are each formed by a lamella with slicings 28 resiliently projecting from its surface in the unstressed state. In the closed state of the securement device, these slicings can come to rest in the proximity of an indentation 29 in the particular counter-securement element 26, 27 such that, in the event of an incipient slipping-through of the securement element 24, 25 with respect to the counter-securement element 26, 27 (under a force overcoming the acting friction forces into the adjustment direction 13), the edge of the slicing 28 comes to abutment at the edge of the indentation 29, whereby subsequently an additional retaining force acting under form closure is provided against a displacement of the particular securement element 24, 25 with respect to the counter-securement element 26, 27. Such a realization is analogously disclosed, for example, in the prior art according to WO 2007/009576 A1.

The securement elements 24, 25 can each cooperate with the counter-securement elements 26, 27 under frictional closure or form closure or, for example, in the manner previously described under form closure as well as also under friction closure. For the realization of a form closure, for example, a construction with at least one securement element formed by a tooth plate can also be employed, such as is known, for example, within the above described prior art according to DE 10 2007 003 091 B3.

If, in the closed state of the securement device, the securement elements 24, 25 are tightened against the counter-securement elements 26, 27, the side jaws 1, 2 are thereby also pressed onto the side shanks 14, 15 in contact thereon of the intermediate unit 8, and these shanks in turn are pressed onto the side faces in contact thereon of the jacket unit 4. In the example, for the establishment of a defined contact, beads or stampings 38 are realized on the side jaws. The displacement of the jacket unit 4 with respect to the intermediate unit 8 into the length adjustment direction 12 is thereby secured in position. In this embodiment, this securement in position is thus accomplished by frictional closure.

The first securement element 24 is safeguarded by the nut 30 disposed on the clamp bolt 18 or by the disk 31 located between the nut 30 and the first securement element 24 against an axial displacement on the clamp bolt 18 directed away from the actuation lever 21. By a first spring-elastic element 32, which here is formed by at least one spring tongue on the securement element 24, the first securement element 24 is pressed onto the disk 31. The spring tongue is herein stayed against the first side jaw 1. The securement element 24 is thereby held in abutment on the first holding element 36, and this, in turn, in abutment with disk 31 and therewith follows an axial shifting of the clamp bolt 18. Disk 31 can also be realized as an axial thrust bearing such that during turning of the clamp axis the friction is reduced through rolling bodies.

The first securement element 24 could, for example, also be connected with the clamp bolt 18 through material closure, for example by being welded together or be realized integrally therewith, for example in the form of a head disposed on clamp bolt 18. However, the depicted slip-on bearing on the first holding element 36, an extension of which penetrates the elongated hole recess of the first securement element, is to be preferred.

During the opening and closing of the securement device by means of the actuation lever 21, the clamp bolt 18 is shifted into its axial direction with respect to the side jaws 1, 2 whereby the first securement element 24 disposed on the clamp bolt 18 is simultaneously moved along with the clamp bolt 18 during the axial shifting of the clamp bolt 18 during the opening and closing of the securement device 10.

The second securement element 25 is disposed on the clamp bolt 18 displaceably into the axial direction thereof, and a spring-elastic element 33 acts in terms of an off-setting of the second securement element 25 from the second counter-securement element 27. The second spring-elastic element 33 in the depicted embodiment is realized analogously to the first spring-elastic element 32 in the form of at least one spring tongue of the second securement element 25 which is stayed on side jaw 2.

The spring-elastic elements 32, 33 could, for example, also be stayed on the side shanks 14, 15 of the intermediate unit 8, wherein here the pattern would have to be adapted accordingly in order for the spring-elastic elements to be able to extend through the openings 19 or 20 of side jaws 1 or 2, respectively. Conceivable and feasible is the employment for the first and/or second spring-elastic element 32, 33 of a coil spring acting between the first holding element 36 or second holding element 37 and the particular side jaw 1, 2, respectively, or the particular side shank 14, 15, respectively. In this case, the particular securement element with the associated holding element should be secured in position nondisplaceably into the shifting direction of clamp bolt 18. The first and/or second spring-elastic element 32, 33 could also act between the particular securement element 24, 25 and the particular side jaw 1, 2 or the particular side shank 14, 15.

In the region between the side jaws 1, 2 on clamp bolt 18 is located a stop element 34 which is axially nondisplaceable with respect to clamp bolt 18, for example through a welding, such as is shown in FIG. 9. In the closed state of securement device 10 (cf. FIG. 5), the stop element 34 is spaced apart from a counterstop 35 on which it is in contact in the opened state of the securement device (cf. FIG. 4). In the depicted embodiment, the counterstop 35 is formed by the inwardly directed (e.g. directed toward the other side shank 15) surface of side shank 14 of intermediate unit 8, which is adjacent to the first side jaw 1. In this embodiment, the stop element 34 is consequently also located between the side shanks 14, 15 of intermediate unit 8. In the preferred embodiment, the stop element 34 is disposed on clamp bolt 18 on the side facing away from the cam disk 22 of the center plane extending parallel to the side jaws 1, 2 through the longitudinal axis 11.

Figure 5:
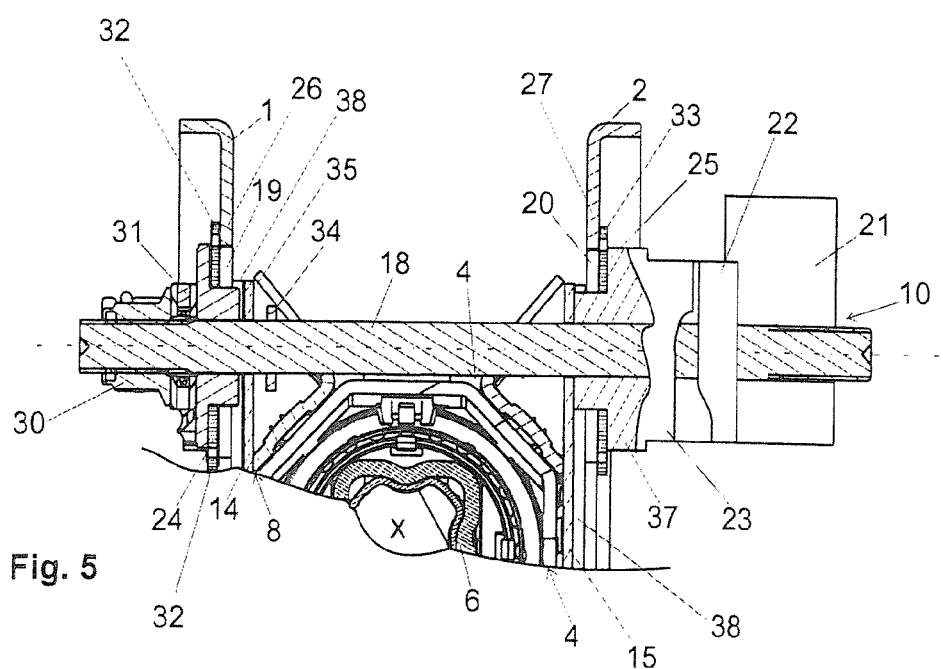
FIG. 5 shows a cross section corresponding to FIG. 4 in the closed state of the securement device.

When, starting from its closed state depicted in FIG. 5, the securement device 10 is opened, first the first securement element 24 is offset from the first counter-securement element 26 through the first spring-elastic element 32 whereby the clamp bolt 18 is entrained and consequently is shifted axially into the direction away from the actuation lever 21 until the stop element 34 comes into contact on the counterstop 35. The first spring-elastic element 32 is for this purpose laid out so that the force exerted by it exceeds the force exerted by the second spring-elastic element 33, and a displacement of stop element 34 onto the counterstop 35 against the force exerted by the second spring-elastic element 33 is effected. After the stop element 34 has come into contact on the counterstop 35, the clamp bolt 18 cannot shift further into this axial direction and the remaining path enabled during the opening of the securement device 10 is used up for a displacement in the opposite direction of the second securement element 25 with respect to the second counter-securement element 27, whereby the second securement element 25 is offset from the second counter-securement element (cf. FIG. 4).

Through the realization according to the invention, the spring deflections enabled during the opening of the securement device are consequently distributed in defined and predeterminable manner onto the two securement elements 24, 25, which are located on opposing sides of the jacket unit 4 or on opposing sides of a vertical center plane including the longitudinal axis 11 of the steering spindle 6 and extending parallel to the side jaws 1, 2.

It can thereby be ensured, for example, that in the opened state of the securement device, the slicings 28 of the securement elements 24, 25 do not become stuck in the indentations 19 of the counter-securement elements 26, 27.

FIGS. 6, 7, 8 and 9 depict a modified embodiment of the invention for a steering column adjustable in height and length, in which the fixing of the jacket unit with respect to the body-stationary side jaws 1, 2 is effected via a form closure. For greater clarity, the same reference numbers have been utilized for identical structural parts or parts that fulfill identical functions even if it involves modified structural parts as were utilized for the other embodiments. All features not separately explained for this embodiment have already been explained in the other embodiments and substantially correspond to them.

According to the embodiment of the invention according to FIGS. 6, 7, 8 and 9, the jacket unit 4 is retained between the body-stationary side jaws 1, 2 of support unit 3 and supports the steering spindle 6 rotatably about the longitudinal axis 11. The jacket unit 4 includes an elongated hole 55 which extends parallel to the longitudinal axis 11 of the steering spindle 6 (=in the length adjustment direction 12) and delimits the movement of the clamp bolt 18 projecting through this elongated hole 55. Parallel to the length adjustment direction 12 and parallel to elongated hole 55 on one side of the jacket unit, one or several toothings 52 are disposed as counter-securement element 26, and, in the example, are worked integrally into the surface of the jacket unit 4. These toothings 52 can alternatively also be realized as separate toothed strips secured on the jacket unit. The side jaws 1, 2 of support unit 3 include openings 19, 20 extending in the second adjustment direction 13 and delimiting, as in the embodiment according to FIGS. 2 and 3, the movement of clamp bolt 18 which projects through this elongated hole 55. Parallel to the adjustment direction 13 and to opening 20, a toothing 53 is disposed on the side jaw 2 as a counter-securement element 27. In the example, the toothing 53 is here also directly worked into the side jaw 2. This can be carried out, for example, simply such that the margin of opening 20 is curved over and provided with the corresponding toothing. These toothings 53 can alternatively also be realized as separate toothed strips to be secured on the side jaw 2.

The first securement element 24 in the embodiment is formed by toothings 39 which are secured on a first holding element 36 or are formed integrally with it. The second securement element 25 is formed in the example by toothings 50 held on a second holding element 37. The two first securement elements 25, are preloaded by a spring 51 in the direction toward the second counter-securement element 27 in order to be able to compensate tolerances and to ensure that in the closed state of the securement device 10 as much clamping tension as possible is introduced into the jacket unit 4.

The second holding element 37 is realized in the example unitarily with the link disk 23. As is realizable in all other embodiments, the realization in two parts is conceivable and feasible.

FIG. 6 shows the steering column in the closed state of the securement device 10. By turning the actuation lever 21, the securement device 10 is opened and the clamp bolt 18 shifted. Through a first spring-elastic element 32, realized here in the form of a compression spring, the first holding element 36 and therewith the securement device and the clamp bolt are shifted until the stop element 34 comes into contact with the counterstop 35. The toothings 39 of the first securement element 24 and the toothings 52 of the first counter-securement element 26 are offset from one another (that is, they are separated from one another). The preferably weaker, second spring-elastic element 33, realized here in the form of a compression spring, displaces the second holding element 37 and the second securement elements 25 connected thereto until the entire cam lift of the assemblage of cam disk 22 and link disk 23 is exhausted. It can thereby be ensured that the second toothings 50 of the second securement element 25 are also spaced apart from the toothings 53 of the second counter-securement element 27, that is, are separated.

In the opened state of the securement device 10 the jacket unit can be moved freely within the delimitation, given by the openings 19, 20 in the side jaws and the elongated hole 55 in the jacket unit 4, in the height or inclination and length position, which means in the adjustment directions 13 and length adjustment direction 12. The solution according to the invention ensures that all toothings contributing for fixing the steering column in the closed state of the securement device 10 are separated from one another such that they cannot stick during the adjustment.

Figure 2:
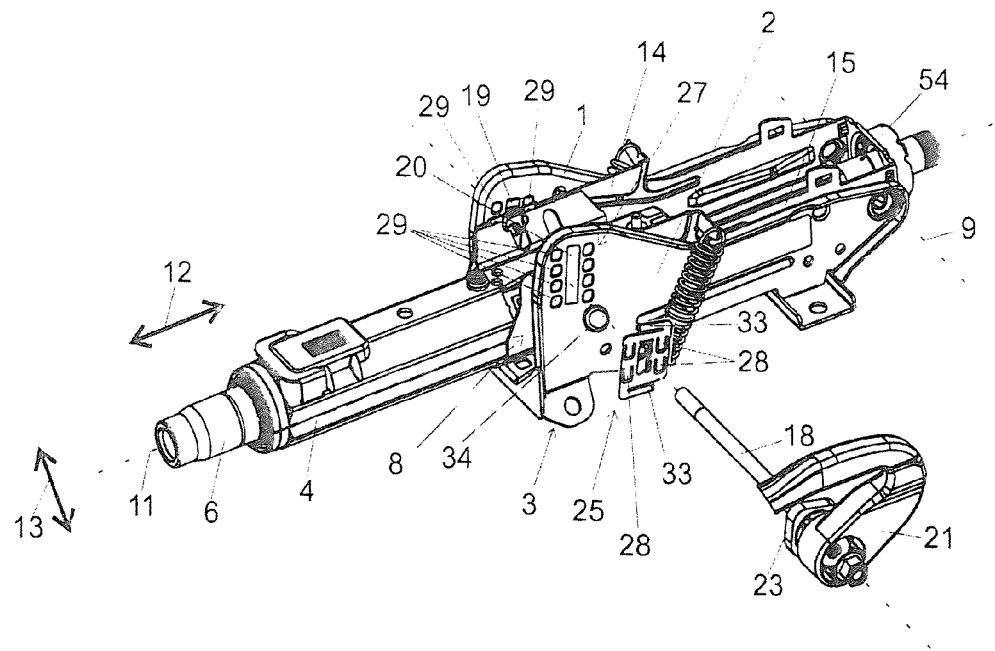
FIG. 2 shows the steering column of FIG. 1 from a different line of sight with parts of the steering column being pulled apart in an exploded view.
Figure 3:
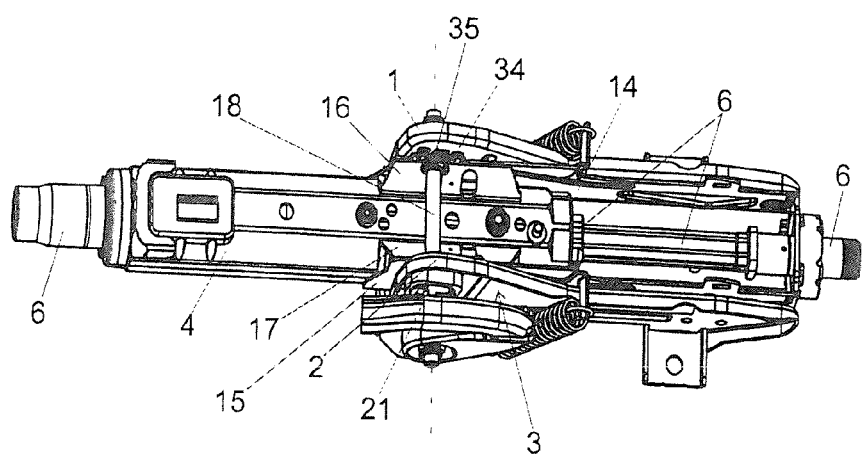
FIG. 3 shows the steering column of FIG. 1 from yet another line of sight.
Figure 4:
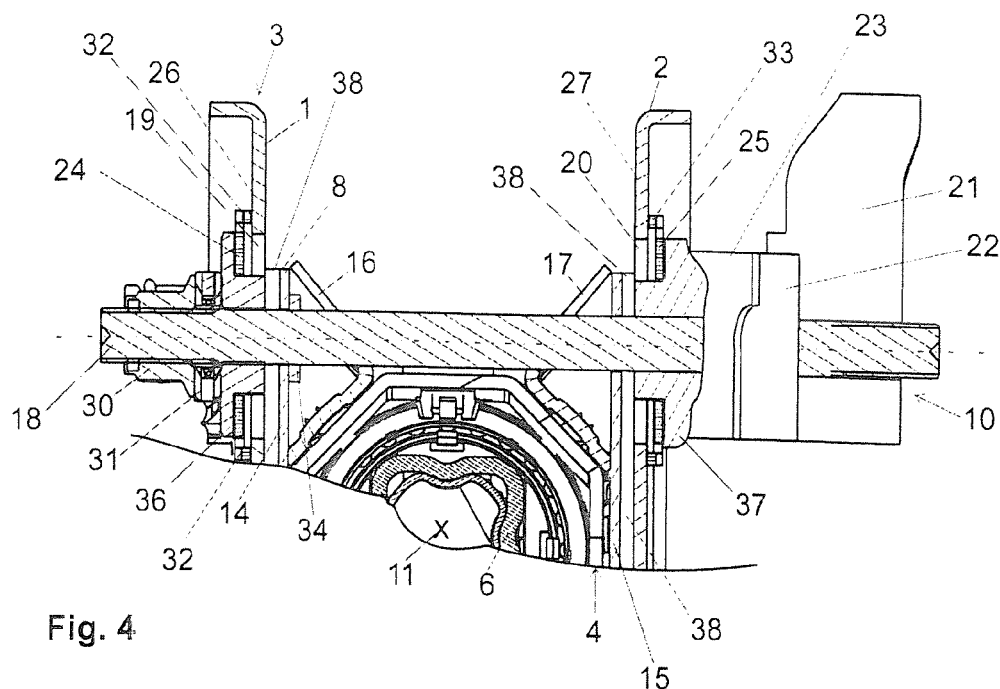
FIG. 4 shows a portion of a cross section through the steering column of FIG. 1 in the proximity of the clamp bolt, in the opened state of the securement device.

To form the swivel axis 9 as it is depicted in the embodiment according to FIGS. 2 and 3, the (not shown) universal joint can be utilized which is disposed on the steering spindle on the side facing away from the steering wheel-side end 5 of the steering spindle. It is also conceivable and feasible to secure the bearing 54, in which the section of the steering spindle is supported which is disposed on the steering spindle on the side facing away from the steering wheel-side end 5 of the steering spindle, on the support unit 3 (circumventing the intermediate unit 8 not provided in this embodiment). Herein, a rotatability of the bearing 54 about the axis 9 with respect to support unit 3 must be enabled.

It is apparent that it is readily feasible to combine the characteristics and elements of the several embodiments of the invention. For example, in one application can be employed frictional closure securement elements as well as also form closure securement elements with corresponding counter-securement elements. For the invention, it is only significant that the spacing of the securement elements from the corresponding counter-securement element is settable under predefinition through the corresponding stop element 34 in combination with a counterstop 35.

Figure 10:
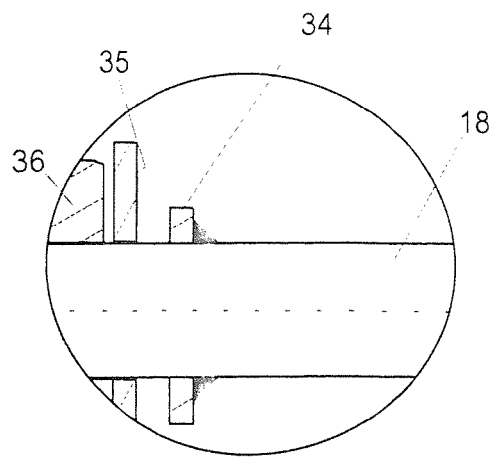
FIGS. 10 and 11 show several feasibilities for attaching the stop element on the clamp bolt.
Figure 11:
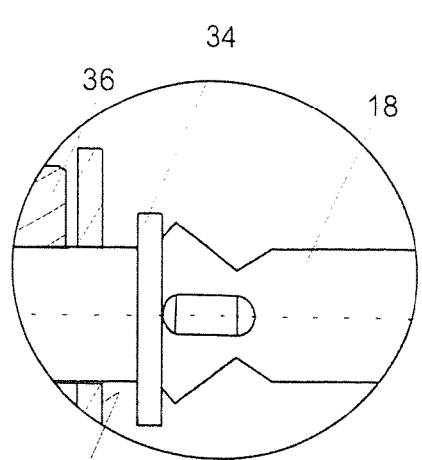

For the axially nondisplaceable securement in position of a disk-shaped stop element 34 on the clamp bolt 18, the stop element can advantageously be pressed onto the clamp bolt 18 and during the mounting be positioned on a predefined axis position. Apart from the welding connection illustrated schematically in FIG. 10, an adhesion connection, for example, is also conceivable and feasible. Advantageous is a securement of the stop element 34 in position on the clamp bolt 18 by swaging as is shown schematically in FIG. 11.

Figure 12:
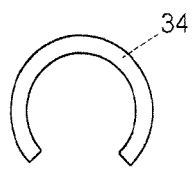
FIG. 12 shows a further realization feasibility of a stop element.
Figure 13:
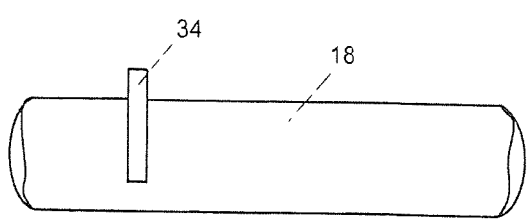
FIG. 13 shows the stop element of FIG. 12 secured in position on the clamp bolt.

FIGS. 12 and 13 show further an embodiment in which the stop element 34 is realized as a non-closed cylindrical ring which is pressed in a type of clip connection from the side onto the clamp bolt. This embodiment is to be seen as especially advantageous since it is extremely simple to mount. However, a sufficiently strong connection must be ensured through the construction.

A realization that is adjustable by a threading in the axial direction of the clamp bolt is also in principle conceivable and feasible.

Figure 14:
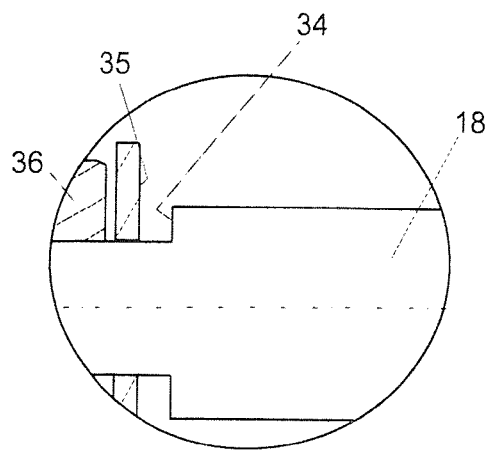
FIGS. 14 and 15 each show a further realization feasibility of a stop element.
Figure 15:
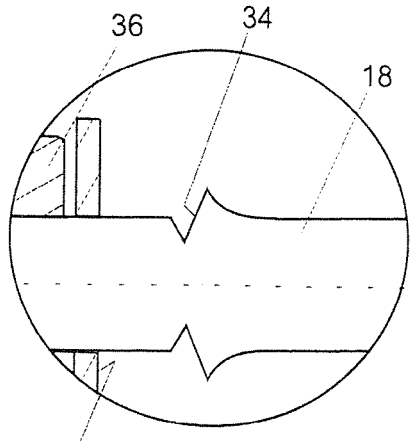

The stop element 34 can furthermore also be worked integrally into the clamp bolt 18 as is illustrated in FIGS. 14 and 15. FIG. 14 depicts an embodiment in which the clamp bolt 18 includes two regions with different outer diameters, between which in the transition region a step is realized as a stop element 34. FIG. 15 depicts an embodiment in which the stop element 34 is formed by a step in the clamp bolt which is worked through a reforming operation, similar to swaging, into the jacket surface of the clamp bolt. The relocation of the material entailed in the reforming operation leads to a diameter reduction in a specific axis region and in a directly adjacent axis region, to a diameter expansion. In this manner a stop element 34 is formed which even has a form equivalent to a relief groove which ensures that the counterstop 35 does not become jammed with the clamp bolt 18 in the proximity of the stop element 34. It is herein conceivable and feasible to employ a circumferential roll milling operation instead of the swaging or pressing operation.

The cooperation of the securement elements 24, 25 and counter-securement elements 26, 27 in the closed state of the securement device can be one of friction closure and/or form closure. On the opposing sides of the jacket unit 4, different types of cooperation can be provided, for example on one side friction closure and on the other side form closure. The counter-securement elements 26, 27 can herein be formed by separate parts secured in position on the outer surface of the side jaws 1, 2 directed away from the jacket unit 4 or also be realized unitarily with the side jaws 1, 2. In the latter case, for example, they can be formed in a pure friction-closure connection between the securement element 24 and 25 and counter-securement element 26 and 27, respectively, by the exterior surfaces forming friction faces of the side jaws 1, 2.

In the case of a steering column adjustable only in the length adjustment 12, for example, the cooperation of the securement elements 24, 25 with the counter-securement elements 26, 27 could also serve only for the transmission of pressure forces onto the side jaws 1, 2 in order to press these onto the interspaced parts.

Except for the embodiments corresponding to FIGS. 6, 7, 8 and 9, securement in position in the length adjustment direction 12 in the depicted embodiments, takes place only by cooperating friction faces. For this securement in position elements cooperating under form closure or friction and form closure can also be provided, as is known, for example, within the prior art cited in the introduction or can be found in the embodiment according to FIGS. 6, 7, 8 and 9.

A steering column adjustable in the length adjustment direction 12 as well as also in the adjustment direction 13 of height or inclination adjustment can also be realized without an intermediate unit 8, as is also known and can be found in the embodiment according to FIGS. 6, 7, 8 and 9. The swivellability of the jacket unit 4 with respect to the support unit 3 for the height or inclination adjustment could alternatively also be effected through elongated holes extending parallel to the longitudinal axis 11 of the steering spindle 6 into which engage pivot pins. This swivel axis could also be formed by a universal joint connecting two steering spindle sections. Such implementations are also known.

The counterstop 35 could, in particular also in a realization without an intermediate unit 8, also be disposed on the inner surface of the first side jaw 1 (thus on the face directed toward the second side jaw 2) or on an inner surface of the jacket unit 4 (which is facing the vertical center plane penetrating the longitudinal axis 11 and located parallel to the side jaws 1, 2).

Instead of a cam disk 22 and a link disk 23, other clamping elements for the axial shifting of the clamp bolt 18 with respect to the side jaws 1, 2 and for the axial displacement of the second securement element 25 with respect to the clamp bolt 18 could also be provided. In particular, systems in which rolling bodies are guided on cam tracks can be employed with advantage.

It is also conceivable and feasible to dispose the actuation lever 21 on the side of the clamp axis facing away from the cam-link disk pair or at another axis position on the clamp axis.

The invention is also applicable in the case of electrically or hydraulically or pneumatically actuatable securement devices.

Legend to the Reference Numbers
1 First side jaw
2 Second side jaw
3 Support unit
4 Jacket unit
5 Steering wheel-side end
6 Steering spindle
7 Connection section
8 Intermediate unit
9 Axis
10 Securement device
11 Longitudinal axis
12 Length adjustment direction
13 Adjustment direction
14 Side shank
15 Side shank
16 Web
17 Web
18 Clamp bolt
19 Opening
20 Opening
21 Actuation lever
22 Cam disk
23 Link disk
24 First securement element
25 Second securement element
26 First counter-securement element
27 Second counter-securement element
28 Slicing
29 Indentation
30 Nut
31 Disk
32 First spring-elastic element
33 Second spring-elastic element
34 Stop element
35 Counterstop
36 First holding element
37 Second holding element
38 Bead
39 First toothing
50 Second toothing
51 Spring
52 Toothing
53 Toothing
54 Bearing
55 Elongated hole

The invention claimed is:

1. An adjustable steering column for a motor vehicle, comprising:
a jacket unit rotatably supporting a steering spindle;
first and second body-stationarily securable side jaws between which the jacket unit (4) is disposed; and
a securement device, in the opened state of which the jacket unit is displaceable at least into one adjustment direction with respect to the side jaws and, in the closed state of which, the set position of the jacket unit is secured in position with respect to the side jaws, the securement device including:
a clamp bolt penetrating through openings, the clamp bolt being configured such that, during the opening and closing of the securement device, the clamp bolt is shifted in its axial direction;
first and second securement elements between which the jacket unit is disposed and of which the first securement element in the closed state of the securement device cooperates with a first counter-securement element, which is disposed on the first side jaw or is retained by it or is disposed on the jacket unit or is retained by it or is disposed on an intermediate unit disposed between the jacket unit and the side jaws or is retained by it, and of which the second securement element in the closed state of the securement device cooperates with a second counter-securement element, which is disposed on the second side jaw or is retained by it or is disposed on the jacket unit (4) or is retained by it or is disposed on the intermediate unit or is retained by it; and
a stop element on or at the clamp bolt in the region between the two side jaws, the stop element being arranged such that, in the closed state of the securement device, the stop element is spaced apart from a counterstop disposed on one of the side jaws or a part connected thereto or on the jacket unit or a part connected thereto or on the intermediate unit or a part connected thereto, and the counterstop is configured so that, in the opened state of the securement device, the axial shifting of the clamp bolt is delimited through cooperation of the counterstop with the stop element.

2. The adjustable steering column of claim 1, wherein the first securement element is configured so that, during the axial shifting of the clamp bolt during the opening and closing of the securement device, the first securement element moves simultaneously with the clamp bolt.

3. The adjustable steering column of claim 1, wherein the first securement element is disposed on the clamp bolt and is penetrated by the clamp bolt through an opening.

4. The adjustable steering column of claim 1, wherein the second securement element is configured so that, during the opening and closing of the securement device, the second securement element is displaced with respect to the clamp bolt in the axial direction of the clamp bolt.

5. The adjustable steering column 4 of claim 1, wherein the second securement element is disposed on the clamp bolt and is penetrated by the clamp bolt (18) through an opening.

6. The adjustable steering column of claim 1, wherein at least one first spring-elastic element is provided which during the opening of the securement device axially shifts the clamp bolt until the stop element comes into contact on the counterstop.

7. The adjustable steering column of claim 6, wherein the at least one first spring-elastic element cooperates with the first securement element or is formed by a portion of the first securement element and during the opening of the securement device displaces the first securement element in the axial direction of the clamp bolt and herein entrains the clamp bolt.

8. The adjustable steering column of claim 7, wherein at least a second spring-elastic element is provided whose spring force is lower than the spring force of the first spring-elastic element and which during the opening of the securement device, after the abutment of the stop element on the counterstop, spaces the second securement element apart from the second counter-securement element.

9. The adjustable steering column of claim 1, wherein in the closed state of the securement device the cooperation of the first securement element with the first counter-securement element and/or the cooperation of the second securement element with the second counter-securement element effects a retaining force against a displacement of the steering column into an adjustment direction displacing the height or inclination of the steering column.

10. The adjustable steering column of claim 1, wherein the steering column in the opened state of the securement device is adjustable in its length as well as also its height or inclination.

11. The adjustable steering column of claim 1, wherein the intermediate unit located between the jacket unit and the side jaws in the opened state of the securement device for the adjustment of the steering column in its height or inclination is swivellable with respect to the side jaws about a horizontal axis at right angles to the longitudinal axis of the steering spindle.

12. The adjustable steering column of claim 1, wherein the intermediate unit comprises first and second side shanks, each of the first and second side shanks being located between a respective one of the side jaws and the jacket unit.

13. The adjustable steering column of claim 1, wherein the first and second side jaws are parts of a support unit securable on the body of the motor vehicle.

14. The adjustable steering column of claim 1, wherein the two side jaws are disposed between the first securement element and the second securement element.

* * * * *